United States Patent [19]

Meador

[11] 4,171,578
[45] Oct. 23, 1979

[54] BOREHOLE TOOL

[75] Inventor: Edwin L. Meador, Houston, Tex.

[73] Assignee: Sperry-Sun, Inc., Sugar Land, Tex.

[21] Appl. No.: 860,938

[22] Filed: Dec. 15, 1977

Related U.S. Application Data

[63] Continuation-in-part of Ser. No. 763,484, Jan. 28, 1977, abandoned.

[51] Int. Cl.$^2$ .................. G01D 9/42; H01H 35/14; E21B 47/00
[52] U.S. Cl. .................................... 33/314; 307/121; 346/107 W
[58] Field of Search ...... 33/314; 346/33 WL, 107 W, 346/7; 307/119, 121

[56] References Cited

U.S. PATENT DOCUMENTS

| | | | |
|---|---|---|---|
| 3,546,478 | 12/1970 | Lindsey | 307/116 |
| 3,588,908 | 6/1971 | Lindsey | 33/314 |
| 3,638,235 | 1/1972 | Lindsey | 33/314 |
| 3,681,661 | 8/1972 | Koegel | 307/121 |

Primary Examiner—Steven L. Stephan
Attorney, Agent, or Firm—Macka L. Murrah

[57] ABSTRACT

A single shot surveying instrument which is designed to be lowered to a desired location in a borehole and to take a single picture which indicates the direction of the borehole. The instrument operates in a first mode in which a picture is taken after the passage of a preselected period of time, which period is selected to allow sufficient time for the instrument to be properly positioned in the borehole. The instrument also operates in a second mode in which a picture is taken after the lapse of the preselected period of time if there is an absence of motion by the instrument during a last portion of the preselected time period. An indicator light on the instrument provides a check for premature operation of the instrument and for operability of the motion sensing capability.

6 Claims, 2 Drawing Figures

BOREHOLE TOOL

CROSS REFERENCE TO RELATED APPLICATION

This application is a continuation-in-part of applicant's co-pending application Ser. No. 763,484, filed Jan. 28, 1977 (now abandoned).

BACKGROUND OF THE INVENTION

The present invention pertains to a borehole tool, and more particularly to a device for initiating the operation of such a tool upon its reaching an operating position in the borehole.

When making drill holes in the ground, particularly drill holes which run partly through rock and partly through looser earth layers, it often happens that the dip or inclination of the drill hole to the horizontal plane as well as the direction of the hole will vary quite considerably at different depths of the hole. In many cases, therefore, it is important to determine the existing deviations from a desired inclination and direction.

One such apparatus which has been used for the purposes outlined above is termed a single shot magnetic directional survey instrument. Such an instrument is used to obtain a single record of the inclination and the direction of inclination at various depths in a borehole. The instrument is used for the purpose of orienting a hole in directional drilling operations, and also to chart the course of boreholes from surface to total depth during a normal drilling operation. The instrument includes a magnetic compass and a form of inverted plumbbob. These two features are combined into a single compass angle unit which may be available in various ranges of degrees of inclination. A camera unit in the instrument makes a permanent record of the compass angle unit reading at a preset moment in time. Electrical power to the system and to operate lamps in the camera unit may be furnished by batteries or by a conductor cable suspending the instrument from the earth's surface. An electrical circuit for activating the lamps is controlled by a clock which allows a predetermined exposure period of a film disc for recording the inclination and direction of inclination indicated by the compass angle unit. An adjustment feature on the clock typically allows the clock to be set for delayed times ranging from one minute to several hours.

In operating such an apparatus, a desired compass angle unit is selected and assembled, and the batteries and film are loaded with the clock being set for the delayed time needed to reach the survey depth. The instrument is then assembled into a protective casing which can be lowered and positioned in a non-magnetic drill collar at the lower end of the drill stem with the apparatus being suspended on a wire line. Alternatively, the apparatus may be go-deviled into a non-magnetic drill collar and retrieved with an overshot or by pulling the drill string. The instrument may also be lowered into an open hole on a wire line, or by any other convenient method. The compass angle unit is normally comprised of a floating magnetic needle designed so that its directional and angular position may be simultaneously photographed on a disc.

Clock operated survey instruments must be assembled and programmed just prior to the survey since the clock must be set just before the instrument is placed in the well. This is due to the many contingent features that may occur in the drilling of a well and in the operation of equipment for placing the instrument at the surveying location in the wellbore, which might delay the surveying of the well.

In order to set an appropriate delay time in the timing mechanism of the instrument, an estimation must be made as to the time it will take the instrument to be assembled and then either lowered into the wellbore on a wire line, or go-deviled to the bottom. In any event, since the time lapse cannot be predicted with precise certainty, a liberal safety factor must be employed to insure that sufficient time will elapse to permit the instrument to be positioned at the bottom of the borehole or at survey depth. In addition, time must be permitted for the instrument to cease moving or become quiet so that an accurate survey may be performed. Upon lapse of the predetermined time, a lamp circuit is activated which exposes the film to record an image of the compass angle unit.

Since a liberal safety factor must be employed in setting the time for the instrument, a considerable amount of rig time may be used in the running of such a survey. If a directional hole is being drilled for example, and several surveys are run in the course of a day to determine the orientation of the hole, the rig time expended may become very expensive, particularly in situations where rig costs are extremely high such as in offshore operations.

Another approach to the problem of actuating a single shot magnetic directional survey instrument in its proper downhole position is disclosed in U.S. Pat. Nos. 3,638,235, 3,546,478, and 3,588,908. In these patents, the absence of motion of the instrument is sensed to indicate that it is at its proper downhole operating position. One problem encountered with this approach is that occasionally the instrument is loaded and set for use and then inadvertently allowed to lay idle before placement in the borehole for a sufficient amount of time to permit its premature operation. As a result, the film disc which records the inclination is exposed before the instrument is even inserted into the borehole. This results in much wasted time and very high expenses as the operator utilizes all of the time normally required to take a measurement only to find out later, when the film is exposed, that the measurement is erroneous. An indication that the instrument has been operated before insertion into the well is therefore a desirable feature. Additionally, the instruments described in the foregoing patents are all activated by a lack of sensed motion. Under certain circumstances, for example if total absence of motion is not attainable, it may be desirable to operate the instrument solely in response to a lapsed period of time while at other times it may be preferable to operate the instrument upon the absence of motion for a predetermined period of time or a combination of these modes. In any event the option to choose between these modes of operation is a desirable feature in a borehole instrument such as a survey tool.

Another circumstance which can cause wasted time and money is related to the malfunctioning of the motion sensing device and associated electrical circuitry. Should such a malfunction occur and be undetected, an abortive survey is likely. Consequently, it is desirable to provide a means for checking the operability of this function just prior to use of an instrument at the well site.

It is therefore an object of the present invention to provide a new and improved instrument which has selective modes of operation and which eliminates unnecessary delay times presently involved in operating downhole surveying instruments, together with a means of checking functional operating characteristics, resulting in an instrument which is more reliable in operation and more economical to use.

SUMMARY OF THE INVENTION

In accordance with a preferred embodiment, a system is disclosed for actuating a downhole well tool such as a surveying instrument. The system includes means for preselecting a first adjustable period of time after which the instrument may be actuated, means for sensing the absence of motion of the instrument for a second period of time, and means responsive to both the selecting means and the sensing means for actuating the instrument after the first preselected period of time has passed and also if there is an absence of sensed motion of the instrument during the second period of time. Another feature of the instrument provides the operator with a visual verification that the delay circuit is operating normally. Further, in situations wherein motion sensing is not desired, the motion sensor of the instrument may be selectively disconnected as a control function.

DESCRIPTION OF THE PREFERRED EMBODIMENT

Figures 1, 2:
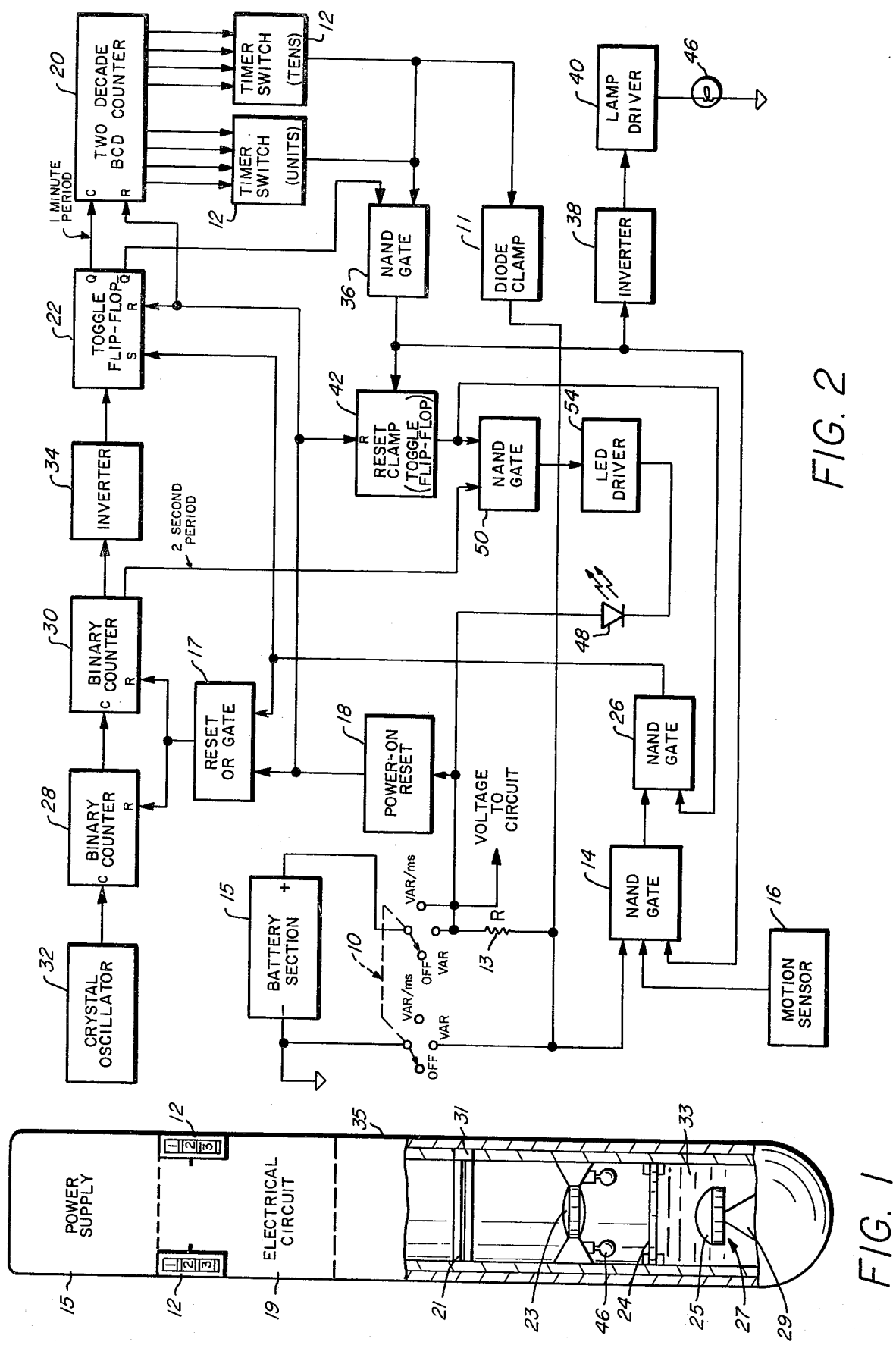
FIG. 1 is a partially cut away schematic view of a directional survey instrument for utilizing principles of the present invention.
FIG. 2 is a schematic diagram of an electrical circuit embodying principles of the present invention.

Referring first to FIG. 1 of the drawings, a schematic view of a well surveying instrument includes at the upper end of the instrument a power supply section 15 which may be in the form of a battery pack or a power supply circuit receiving its power from a conductor cable (not shown) extending to the surface. Immediately below the power supply housing is a control circuit housing 19 which contains the electrical circuitry for operating the surveying apparatus. A lower section 35 of the tool houses the survey instrument and includes a slot 31 for receiving a film disc 21 for recording the survey. Below the film disc is a lens 23 with lamps 46 being positioned below the lens. A glass disc 24 which contains a reticle in its center is positioned below the lamps in the housing. The glass disc also forms the upper end of a chamber 33 containing a fluid in which a compass angle unit 27 is pivotally floated. Indicia on the head 25 of the compass angle unit provides a visual indication of the direction and inclination of the tool housing. The buoyancy of the fluid in the chamber maintains the compass angle unit in a vertical position on its pivot 29 throughout various positionings of the instrument housing in the wellbore. Also shown positioned on the lower section 35 of the instrument are a pair of thumb type rotary switches 12 for operating the corresponding timing switches 12 shown in FIG. 2.

In the operation of the instrument described above, the electrical circuit is activated at some instant of time to energize the lamps 46. The light emanating therefrom is directed through the glass disc 24 onto the head 25 of the compass angle unit 27. The compass angle unit includes a magnetic needle which is oriented in a north-south direction. In addition, the unit is permitted to tilt on its pivot 29 away from the longitudinal axis of the tool to provide an indication of the inclination of the tool in the wellbore. Light impinging upon the head 25 of the unit is reflected back through the glass enclosure 24 and the reticle thereon, through the lens 22, and on to the film disc 21. Therefore, while the lamps are lighted, the film disc is exposed to the image presented by the compass angle unit head and the reticle engraved on the glass. The record of this image provides an indication of the direction and inclination of the borehole.

The present invention pertains to a device for initiating and timing the operation of an instrument such as a directional surveying instrument, however, it is pointed out that the timing circuit would have application to other types of wellbore tools.

The disclosed embodiment includes two manually settable switches. A first mode switch 10 has three positions, an OFF position, a VAR (standing for variable time) position in which the circuit actuates the wellbore surveying instrument after a preselected period of time and without regard to whether the instrument is in motion or not, and a VAR/MS (standing for variable time, motion sensing) position in which the instrument is actuated after a preselected period of time only if there is an absence of motion during a last or second portion of the preselected time period. A timer switch 12 provides for the setting of the preselected period of time. The preselected time period would be chosen in accord with an estimate for the amount of time necessary to place the instrument in the position wherein it is to take its measurement or to otherwise operate, and would also include a safety factor. The timer switch 12 includes a tens selection switch and a units selection switch, each figured in minutes, such that a selection of from zero to ninety-nine minutes in one minute increments is possible. The timer switches 12 may be rotary switches located on the exterior of the instrument housing to permit their convenient setting by hand. The tens and units switches select decoded outputs from a binary coded decimal counter (BCD) or digital counter 20. These decoded outputs are normally low, and turn high only after the completion of the selected time periods. The tens and units outputs are mechanically ANDed in the switch such that a high is produced at the switch output only if both the tens and units decoded outputs are high. Thus depending on the numbers set on the rotary switches 12, a high is passed from the respective BCD counters through the timer switches to the instrument circuit. Output of the timer switches 12 is fed to a "NAND" gate 36, enabling gate 36 to simultaneously pass a 30 second signal from toggle flip flop 22 to a reset clamp 42, to inverter 38, and to "NAND" gate 14. Reset clamp 42 is a toggle flip flop which toggles on the positive transition of the clock input from gate 36. The output of clamp 42 passes to a gate 26 which is a "NAND" gate. Reset clamp 42 also provides a high signal to a "NAND" gate 50. The output of the "NAND" gate 50 is fed to a light emitting diode (LED) driver amplifier 54 which in turn amplifies the signal passed by the gate 50 to drive the LED 48. The other input to "NAND" gate 50 is from binary counter 30 in the form of a two second time base signal providing a one second intermittent high signal to the LED 48. In addition, when gate 36 is enabled, the 30 second signal from toggle flip flop 22 is passed to inverter 38 and to lamp driver 40, wherein the lamp 46 is operated. In the embodiment shown and described in this application, the lamp 46 represents the instrument to be operated by the disclosed circuit.

A crystal oscillator 32 is comprised of active and passive state-of-the-art components to generate a precision time base. The output of the oscillator 32 feeds binary counter 28 and 30 which may be ripple counters. The output of counters 28 and 30 are passed to inverter 34 and then to toggle flip flop 22. The oscillator 32, counters 28 and 30, inverter 34 and flip flop 22 provide a clock for the timing function of the circuit. One output of the toggle flip flop 22 having a one minute time base is passed to the BCD counter 20. A two second time base from counter 30 is passed to "NAND" gate 50 with the signal then passing to an LED circuit.

Battery section 15 is comprised of a plurality of dry cell batteries for supplying power to the circuitry. A mode switch 10 which is shown as a two pole three position rotary switch is connected between the power supply 15 and circuit components. The rotary switch 10 has three settings offering two modes of operation. One setting is the OFF setting which prevents power from being applied to the instrument circuit. A VAR (variable time) setting connects a "NAND" gate 14 input to ground thus disabling the "NAND" gate. In the VAR mode, switch 10 also supplies power to the circuit for instrument operation. A VAR/MS setting (which stands for variable time and motion sensing) enables "NAND" gate 14 to pass signals from the motion sensor 16 and at the same time supplies power to the rest of the circuit. A resistor 13 is connected to positive voltage to enable the gate 14 when the mode switch is in the VAR/MS position. The motion sensor 16 may be of the type disclosed in detail in Lindsey U.S. Pat. Nos. 3,546,478 and 3,638,235. In any event the motion sensor serves to detect motion of the tool and to provide a signal to the gate 14 upon the occurrence of motion. The output of "NAND" gate 36 is also passed to the "NAND" gate 14 and is arranged in the circuit so that when "NAND" gate 36 is operated, to thereby operate the lamp 46, a low level signal is provided to the "NAND" gate 14 which disables gate 14 and prevents passage of a signal from the motion sensor 16 while lamp 46 is on.

A power-on reset 18 is provided in the circuit and is comprised of an RC time constant which when operated sends out a single pulse through "OR" gate 17 which resets counters 28 and 30. It also directly resets toggle flip flop 22, BCD counters 20 and reset clamp 42. The power-on reset is only operated by movement of the mode switch to either the VAR or VAR/MS positions when the operational mode of the instrument is initially selected. Diode clamp 11 is connected between switch 12 and gate 14 and serves to inhibit motion sensor 16 output, until switch 12 passes a signal from counter 20, at the end of the delay time set by switch 12.

It is believed that the easiest way to further explain this circuit is to explain its operation.

Assume that the mode switch 10 is in the VAR (variable time) mode, and that the time switch 12 is set for 5 minutes. In the variable time mode, the mode switch 10 grounds one input terminal to the "NAND" gate 14 which functions to disable motion sensor 16.

Assume now that the instrument has just been turned on. The master reset or power-on reset 18 produces a high pulse to "OR" gate 17 which resets counters 28 and 30. Power-on reset 18 also resets flip flop 22, reset clamp 42, and BCD counter 20. The circuit is then in a totally reset mode, and time base 32 will proceed to clock counter 20 at a 1 pulse per minute rate through binary division of the crystal oscillator 32 frequency output. This is accomplished by passing the output frequency from oscillator 32 through counters 28 and 30 which divide the incoming pulses by the number "N" counting stages in each counter. The signal output of counter 30 is inverted by inverter 34 for logic control of flip flop 22. Flip flop 22 divides its incoming pulses by 2 and has as its output a square wave of one minute period which is sent to first decade counter 20 and a second output displaced 180° in phase with the first output. The second output is sent to gate 36. The binary coded decimal outputs of counter 20 are mechanically decoded by timer switches 12. In this example switches 12 are set for a 5 minute delay by hand manipulation of timer switch 12. At the end of 4 minutes and 30 seconds, the proper BCD code will arrive at the inputs of the BCD switches 12 to produce highs on their outputs and on the input to gate 36. At this time gate 36 has a low on its other input from toggle flip flop 22. Thirty seconds later this low input goes to a high level for 30 seconds enabling gate 36 and causing its output to go low. This low output of gate 36 is inverted through inverter 38 to make the signal high for turning on lamp 46 for 30 seconds through lamp driver 40.

At the end of 30 seconds, output of gate 36 returns to a high level which toggles reset clamp 42 to "0" on its output. This "0" output is applied to "NAND" gate 26 causing gate 26 to apply a continuous reset signal to reset gate 17 which in turn clamps counters 28 and 30 to a reset mode thereby preventing their counting. Due to the latch configuration of reset clamp 42, gate 26 applys the reset signal continuously to thereby terminate all operations until the circuit is reset by power-on reset 18, and thus prevents a recycling of the circuit every five minutes.

Assume now that the mode switch is set at its VAR/MS position and that the timer switch is again set for five minutes. In this mode a picture will be taken after passage of the preselected time period if no motion is sensed by the motion sensor during a last portion (thirty seconds) of the preselected time period. In this position of the mode switch, "NAND" gate 14 input is not grounded and thus is enabled, and the output of motion sensor 16 is therefore capable of being used to reset the counter circuits. Resistor 13 provides a positive signal to gate 14 in the VAR/MS setting of switch 10. However, this positive signal to gate 14 may be clamped to ground through diode clamp 11 when switch 12 has a low on its output. Switch 12 will have a low on its output until the preset time that is manually entered on switch 12 agrees with the output of the BCD counter. Assume now that the time switch has been set at the five minute duration, and that the circuit has just been turned on. The power on reset circuit 18 resets all of the counters to zero as in the VAR mode. The counting then proceeds just as in the VAR mode. At the end of four minutes and thirty seconds, timer switch 12 enables one input of "NAND" gate 36. At the same time the diode clamp 11 is removed from the input of "NAND" gate 14 which is thus enabled allowing sensed motion to reset the counters 28 and 30. BCD counter 20 and flip flop 22 are not reset by sensed motion and hold the count of 4 minutes and 30 seconds. As long as motion is sensed, the resetting continues. Accordingly, counter 20 will not be clocked. If no motion occurs within a 30 second interval, "NAND" gate 36 will be enabled by a second input from flip flop 22 causing its output to go low which in turn activates lamp 46 as described above. The low level from gate 36, which activates lamps 46, is sent to "NAND" gate 14 inhibiting operation of the motion sensing and thereby preventing the possibility of a reset when the lamps are on. At the end of a 30 second period during which the lamps are on, gate 36 output goes positive, toggling reset clamp 42 which sends a low level signal to gate 26. Due to the latch configuration of clamp 42, the low level signal to gate 26 serves to clamp counters 28 and 30 in a reset mode to prevent a recycling every 5 minutes.

The function of an LED indicator light 48 will now be explained. One input to "NAND" gate 50 is a two second time base signal from counter 30. The positive portion of this time base signal is one second. The other input to gate 50 is from reset clamp 42. After the total circuit is reset an output of reset clamp 42 is in a high state, which is one enable to "NAND" gate 50. The output of counter 30 will then be a second enable to "NAND" gate 50, which when enabled passed the one second clock pulse to LED driver 54 for activation of LED 48, causing the LED to flash on and off at one second intervals. This indicates to the operator that the circuit is functioning properly and that everything has been reset. This light will flash until lamps 46 are activated and a picture is taken, and reset clamp 42 has been clocked by "NAND" gate 36 causing its output to go low. This then turns the LED off, indicating that a picture has in fact been taken. If a picture has been taken unintentionally, this indication is very important as it alerts the operator to that fact thus preventing much wasted time and expense in sending the instrument into the borehole for a reading with an already exposed film piece. In the VAR/MS mode the LED also indicates that the motion sensor is functioning. If the instrument is moved, the motion sensor 16 causes reset 17 to keep resetting counter 28 and 30 to prevent it from producing a one second output. Without the one second output, gate 50 will not be enabled, and the LED will not flash. Upon termination of the movement for approximately one second, the LED will start flashing again. This is an important operational check allowing the operator to ensure, before the instrument enters the borehole, that it will in fact detect motion and prevent a picture being taken.

Although at least one embodiment of the present invention has been described, the teachings of this invention will suggest many other embodiments to those skilled in the art.

The invention claimed is:

1. In a borehole tool, apparatus for initiating the operation of an electric circuit to operate the tool upon positioning of the tool at its operating position in the wellbore, which apparatus comprises:
   means for sensing the presence of motion of the tool;
   means responsive to the presence of sensed motion for providing an output motion control signal;
   clock circuit means for providing a clock signal to time the operation of the tool;
   timer means for selectively passing said clock signal upon the passage of a preselected period of time to operate said tool;
   counter means for counting clock signals into said timer means to operate said timer means upon the counting of clock signals for a preselected cumulative time period, said counter means having a resettable portion, said timer means being arranged to accumulate clock signals counted into said timer means; and
   means responsive to said output motion control signal for resetting said resettable portion of said counter means and thereby delay the accumulation of clock signals counted into said timer and also to begin said counter means to recount clock signals to said timer means until said timer means has accumulated a count of clock signals corresponding to said preselected cumulative time period and thereby operate said timer means.

2. The apparatus of claim 1 and further including means responsive to the operation of the tool for disenabling the means for providing an output motion control signal.

3. The apparatus of claim 1 and further including means responsive to the operation of the tool for continuously resetting said resettable portion of said counter means.

4. The apparatus of claim 1 and further including indicator means responsive to the passing of said clock signal from said timer means to operate the tool for providing an indication that said tool has been operated.

5. The apparatus of claim 1 and further including manually selectable means for disenabling the means for providing an output motion control signal, thereby disabling the operation of said resetting means.

6. An apparatus for controlling the operation of a downhole tool comprising:
   power supply means for supplying electrical power to the downhole tool controlling apparatus,
   signal generating means for passing operating signals and clock signals to the downhole tool,
   timer means for controlling the passage of operating signals and clock signals to the downhole tool after the passage of a selected time period,
   resettable control means for controlling the passage of an operating signal to the downhole tool,
   means for detecting a characteristic of the downhole tool and in a response to the detection of such characteristic for resetting said resettable control means,
   selectively operable control means for enabling said detecting means during a last portion of the preselected time period, and means responsive to said selectively operable control means and an output signal from said timer means for passing an operating signal to said resettable control means.

* * * * *